US011866321B1

(12) United States Patent
Bell et al.

(10) Patent No.: US 11,866,321 B1
(45) Date of Patent: Jan. 9, 2024

(54) FUEL SUPPLY CHAIN MANAGEMENT SYSTEM AND METHOD FOR INTEGRATION OF RETAIL GAS STATION, CARRIER TANK TRUCKS, AND FUEL TERMINAL STORAGE TRUCK RACKS

(71) Applicant: MAGELLAN MIDSTREAM PARTNERS, L.P., Tulsa, OK (US)

(72) Inventors: Luke Bell, Tulsa, OK (US); Mark Sanders, Tulsa, OK (US); Zachary Monckton, Tulsa, OK (US)

(73) Assignee: Magellan Midstream Partners, L.P., Tulsa, OK (US)

( * ) Notice: Subject to any disclaimer, the term of this patent is extended or adjusted under 35 U.S.C. 154(b) by 221 days.

(21) Appl. No.: 17/227,939

(22) Filed: Apr. 12, 2021

(51) Int. Cl.
| | |
|---|---|
| *G06Q 10/08* | (2023.01) |
| *B67D 7/04* | (2010.01) |
| *G06Q 10/0631* | (2023.01) |
| *G06Q 20/20* | (2012.01) |
| *G06Q 50/06* | (2012.01) |
| *G06Q 50/28* | (2012.01) |
| *G06Q 30/04* | (2012.01) |
| *B67D 7/14* | (2010.01) |
| *B67D 7/22* | (2010.01) |
| *B67D 7/16* | (2010.01) |
| *B67D 7/30* | (2010.01) |
| *B67D 7/78* | (2010.01) |
| *G06F 16/953* | (2019.01) |

(52) U.S. Cl.
CPC ............. *B67D 7/04* (2013.01); *B67D 7/14* (2013.01); *B67D 7/16* (2013.01); *B67D 7/22* (2013.01); *B67D 7/224* (2013.01); *B67D 7/307* (2013.01); *B67D 7/78* (2013.01); *G06F 16/953* (2019.01); *G06Q 10/06315* (2013.01); *G06Q 20/203* (2013.01); *G06Q 30/04* (2013.01); *G06Q 50/06* (2013.01); *G06Q 50/28* (2013.01)

(58) Field of Classification Search
CPC ....................................................... G06Q 10/08
USPC ........................................................ 705/7.25
See application file for complete search history.

(56) References Cited

U.S. PATENT DOCUMENTS

| 10,387,808 | B1* | 8/2019 | Scott ................. G06Q 50/06 |
| 2006/0157145 | A1* | 7/2006 | Hillam ............. G06Q 20/203 |
| | | | 141/198 |
| 2006/0157148 | A1* | 7/2006 | Hillam ................ B67D 7/348 |
| | | | 141/198 |
| 2009/0070175 | A1* | 3/2009 | Bauqhman ........ G06Q 10/087 |
| | | | 701/469 |
| 2014/0316589 | A1* | 10/2014 | Lichtash .............. G05B 19/18 |
| | | | 700/282 |

(Continued)

*Primary Examiner* — Nga B Nguyen
(74) *Attorney, Agent, or Firm* — GableGotwals

(57) ABSTRACT

A central fuel management system includes a pre-authorization module arranged to receive carrier, trailer, and driver identifying information; match, for each meter under a truck rack, one or more loads associated with the carrier, trailer, and driver identifying information; query for each of the one or more loads: a nomination system containing information on book stock; a terminal automated system containing information on physical inventory at two or more terminals; and a third party allocation management system containing information on loading quantity limits. On the basis of the query the pre-authorization module decides whether each load of the one or more loads is authorized prior to its loading. Where authorized, the driver loads at the truck rack.

12 Claims, 11 Drawing Sheets

(56) References Cited

U.S. PATENT DOCUMENTS

2016/0039656 A1\* 2/2016 Walsh ...................... B67D 7/78
  700/283
2019/0367353 A1\* 12/2019 McNamara ............ B67D 7/145
2020/0065845 A1\* 2/2020 LeBlanc, Jr. ...... G06Q 30/0219

\* cited by examiner

FUEL SUPPLY CHAIN MANAGEMENT SYSTEM AND METHOD FOR INTEGRATION OF RETAIL GAS STATION, CARRIER TANK TRUCKS, AND FUEL TERMINAL STORAGE TRUCK RACKS

BACKGROUND

This disclosure relates to fuel management systems designed to monitor fuel inventory at a retail store, such as a convenience store, and fulfill orders for fuel from the retail store.

Prior art fuel management systems include a customer-side and a midstream- or supplier side. The customer-side focuses on integrating components downstream of the fuel terminal's truck rack where tankers or trailers receive fuel for delivery to the retail store. In between these two sides are proprietary and third party carrier dispatch and fuel supply chain management systems. See FIG. 1.

The retail store may have a fuel management system that communicates with a proprietary fuel supply chain management system which, in turn, communicates with a proprietary carrier. Or, the retail store's fuel management system may communicate with a carrier dispatch management system or a third party fuel supply chain management system which, in turn, communicates with a carrier.

The carrier may have to interface with a dispatch or third party system and may deliver fuel to two or more different retail stores, each owned by a different entity. Regardless of the fuel management system configuration or the number of fuel deliveries, the driver must manually input the correct information when loading the tank truck at the truck rack.

The supplier side focuses on integrating components upstream of the truck rack. The supplier side may include a terminal automated system that interfaces with a third party allocation management system, including managing multi-tenant fuel storage tanks. The supplier-side systems require manual input from the driver when at the truck rack.

Therefore, the success of a customer correctly fulfilling the right amount of fuel to its retail store is completely dependent on the fuel tank driver manually inputting all of the correct information. Input errors, lack of real-time inventory data, and the use of disparate and siloed information systems contribute to supply chain disruptions.

SUMMARY

Embodiments of a fuel supply chain management system and method of this disclosure provide integration of retail gas station or convenience store fuel tanks with carrier tank trucks and fuel terminal storage truck racks. The system and method include a preauthorization module that allows a driver or dispatcher to enter identifying information (e.g. carrier ID, trailer ID, driver ID) and, for each meter under the truck rack, load information (e.g. supplier ID, loading control number, product code, additive, house or propriety recipe, and destination ID). Loading of the truck then occurs, followed by immediate electronic notification to a system (e.g. fuel supply chain management system or dispatch management system) responsible for fulfilling the demands of the retail gas station. All associated databases are updated. A user portal allows the carrier company visibility into completed loads.

The preauthorization module may be loaded as a software application onto a portable computing device such as a tablet or mobile phone or stationary computing device located in a kiosk at or near the truck rack. The preauthorization module communicates over a network with a nomination, transportation, logistics, storage, and inventory management module ("user portal") which then may be queried by the carrier company. The user portal also communicates over the network with to inform the terminal automated system and verify that third party allocation management systems will allow a load to occur before the driver arrives and no manual inputs will be required from the driver.

Embodiments of a system and method of this disclosure provide real-time responsiveness to inputs from all users as well as a series of dynamic, graphical user interfaces that display relevant information and visual cues that enable inventory management, shipping, and loading decision support. The system and method provide transparency at all levels or points of the supply chain including the physical network as well as administrative functions such as spending and billing.

DRAWINGS

FIG. 1 is a flow diagram of a prior art fuel management system. The system feeds into user portals for carriers to see where demand is, or integrate into fuel supply chain management, carrier dispatch systems, or proprietary fuel supply chain management systems, so that carriers or suppliers can manage logistics to fulfill store needs. When a carrier arrives at the truck rack, the carrier inputs the request from a store, loads, and then takes the load to the store. The system is completely dependent on a driver inputting the correct information when loading at the truck rack.

Figure 4:
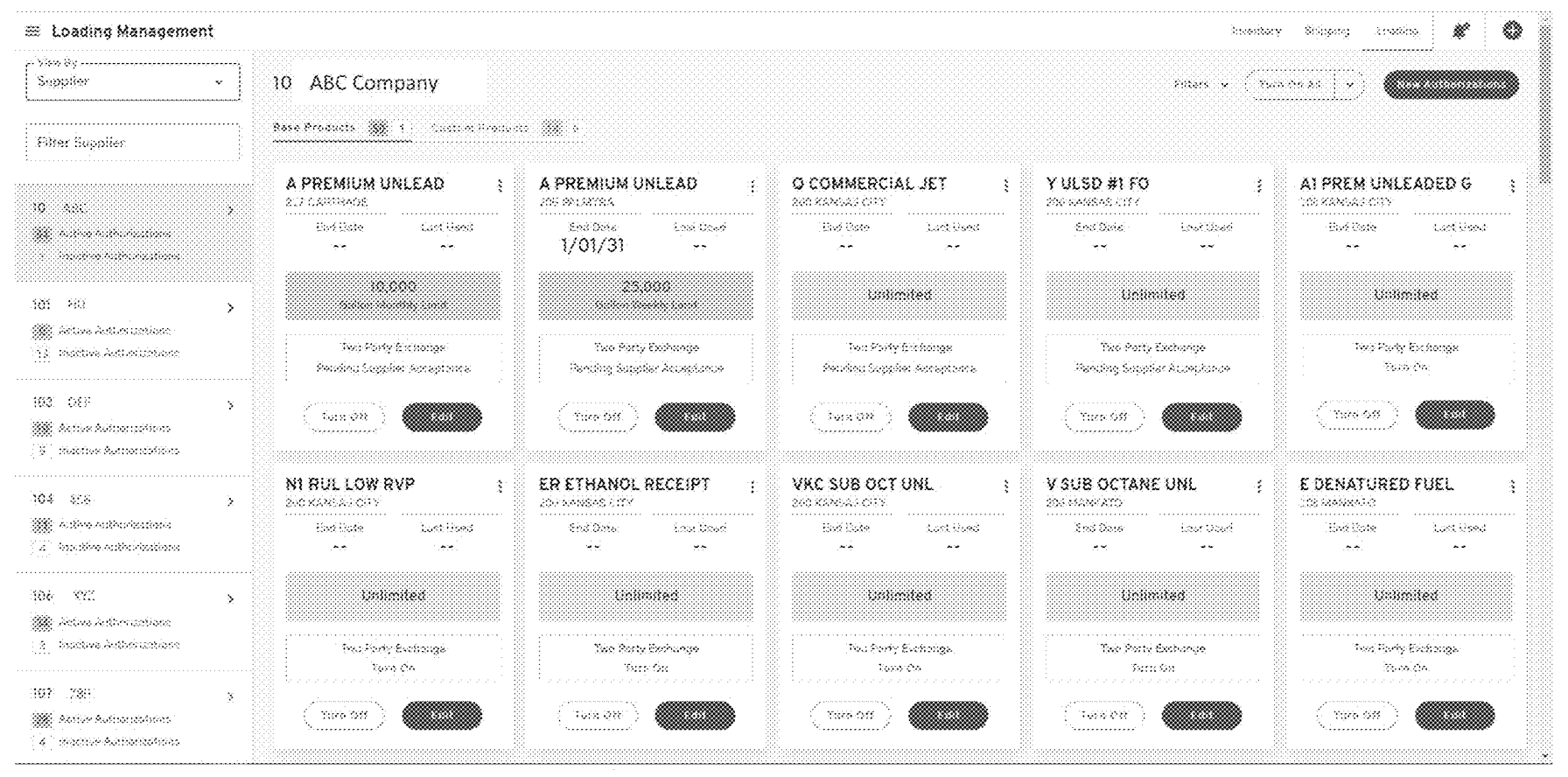

FIG. 4 is an embodiment of a graphical user interface of this disclosure providing information on supplier authorizations. In FIG. 4, and in the figures that follow, supplier company names are represented by pseudonyms such as ABC or XYZ or 123 or 789, for the purpose of this disclosure. In addition to the company name, embodiments include an identifying number.

Figures 5, 6:
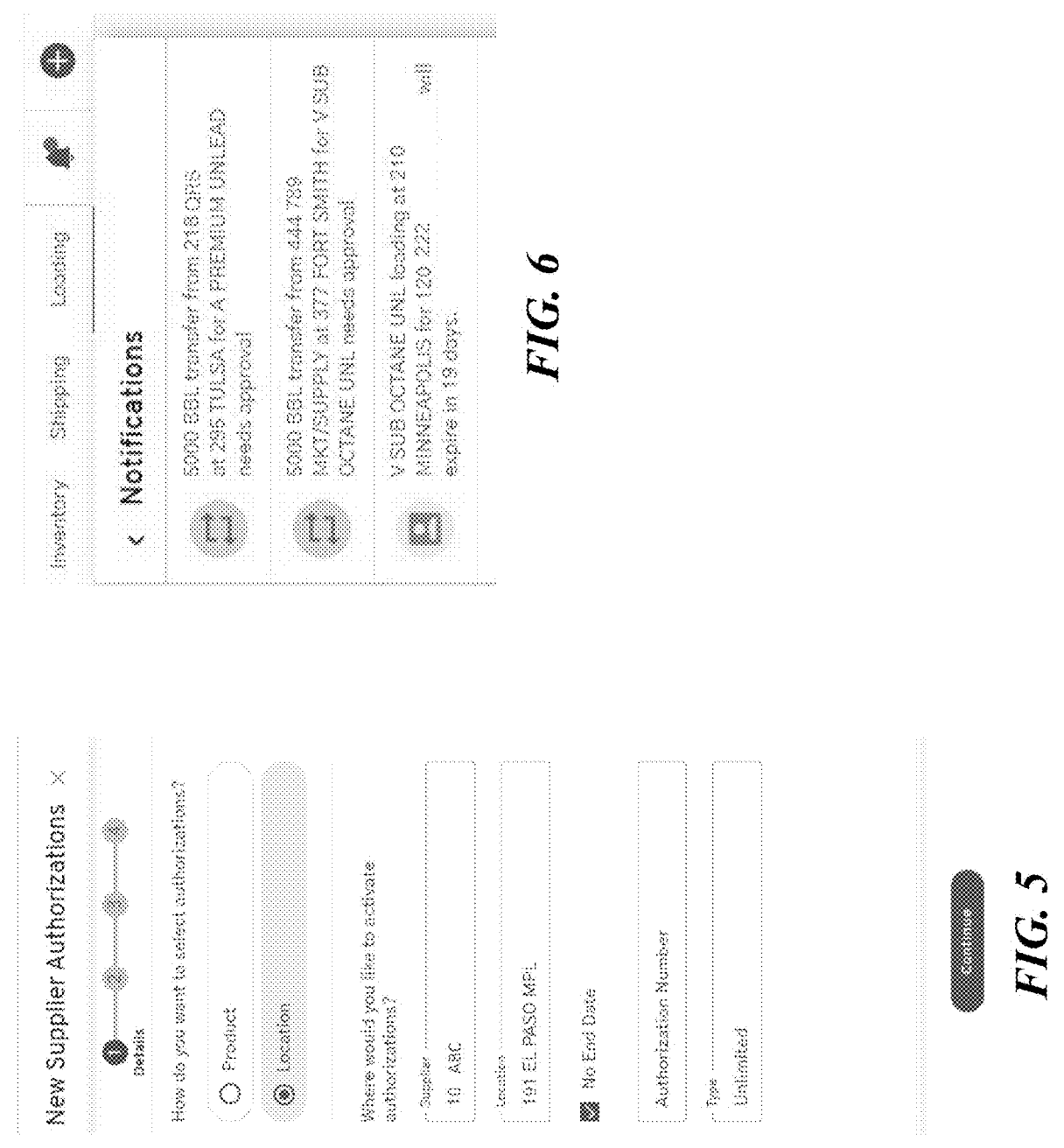

FIG. 5 is an embodiment of a graphical user interface of this disclosure for creating a supplier authorization.

FIG. 6 is an embodiment of a graphical user interface of this disclosure that provides notifications of inventory, shipping, and loading.

Figure 7:
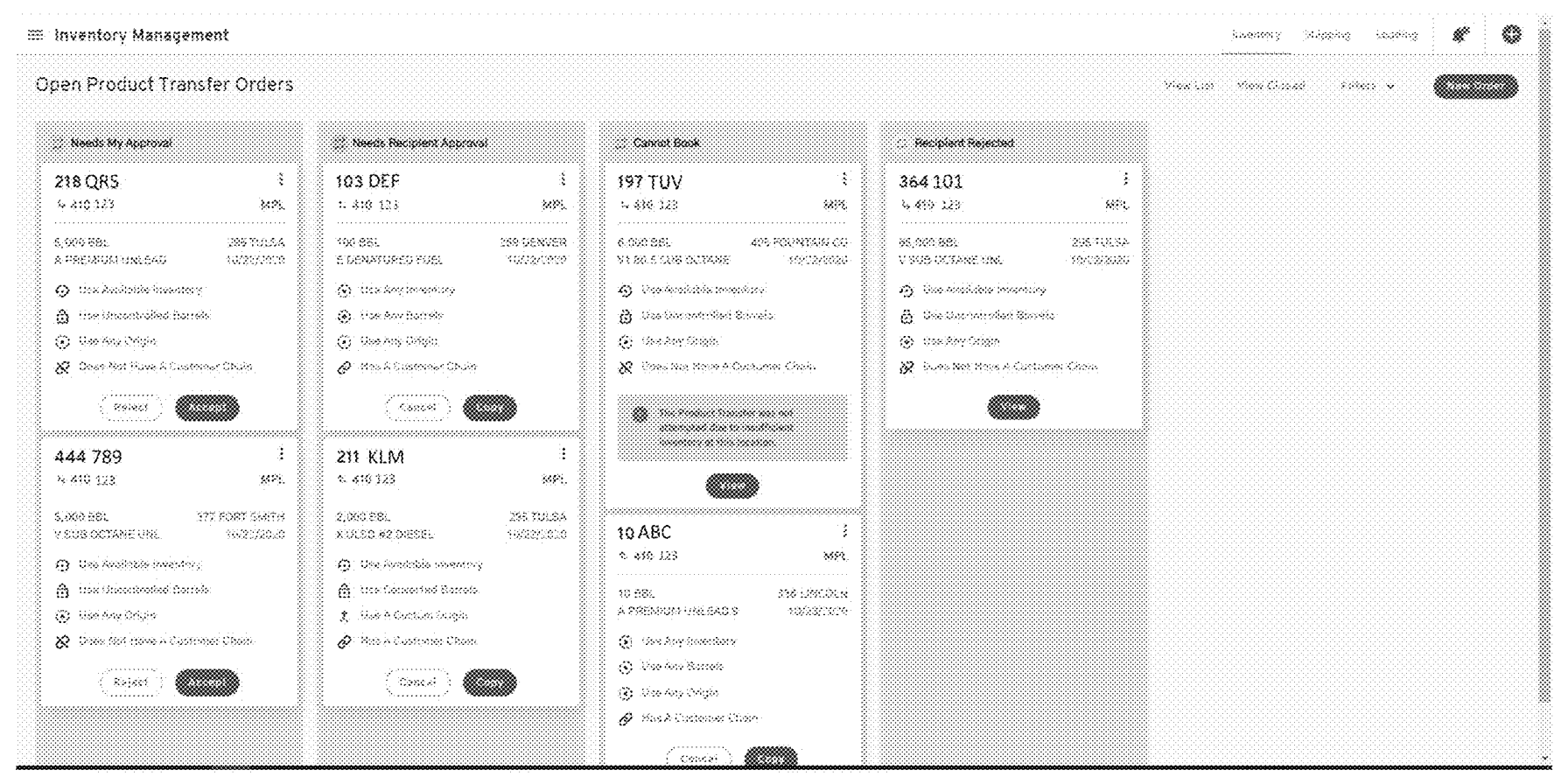

FIG. 7 is an embodiment of a graphical user interface of this disclosure for inventory management and showing open product transfer orders.

Figures 8, 9:
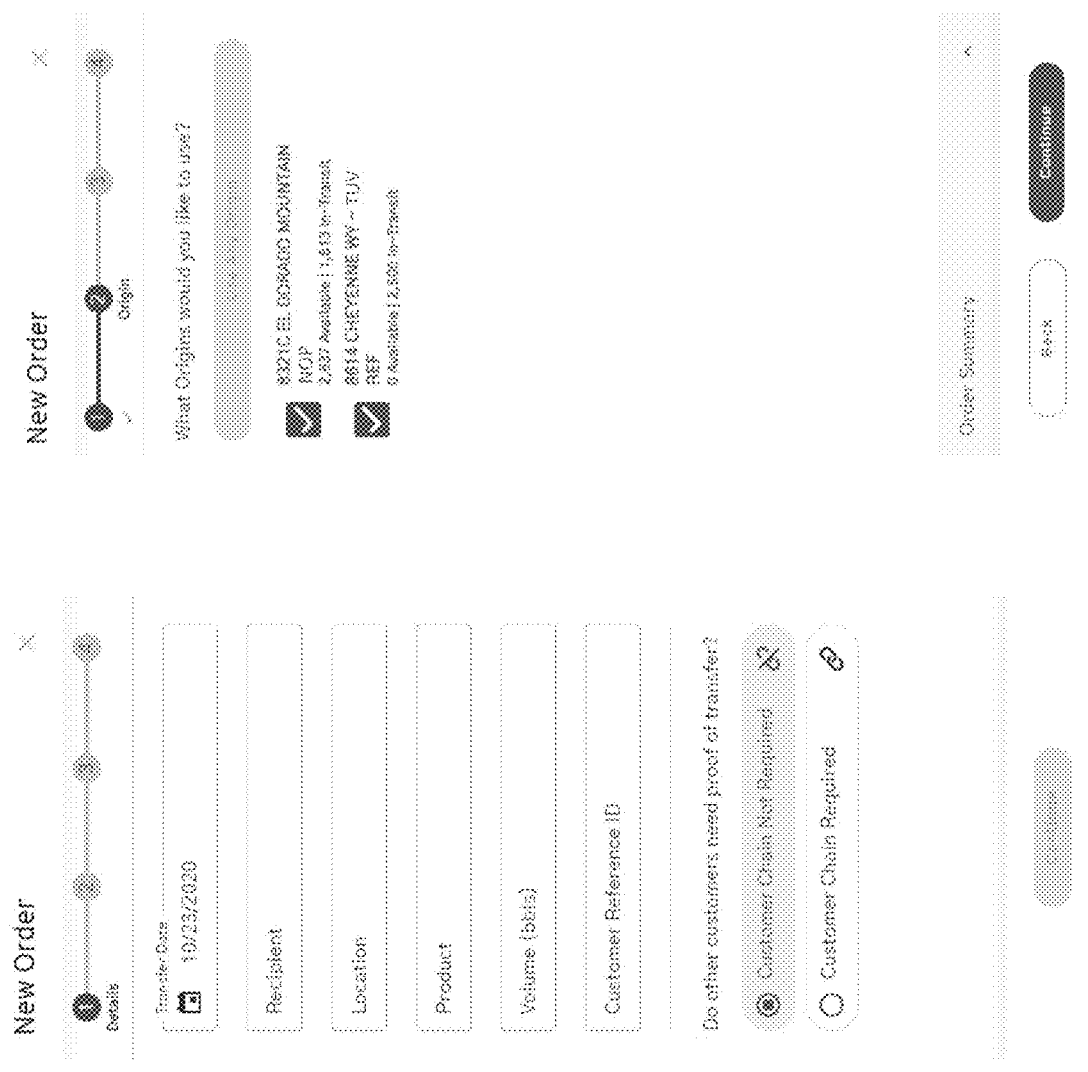

FIG. 8 is an embodiment of a graphical user interface of this disclosure for placing a new order through a user portal of this disclosure.

FIG. 9 is an embodiment of a graphical user interface of this disclosure for identifying one or more origins for the new order through the user portal.

Figures 10, 11:
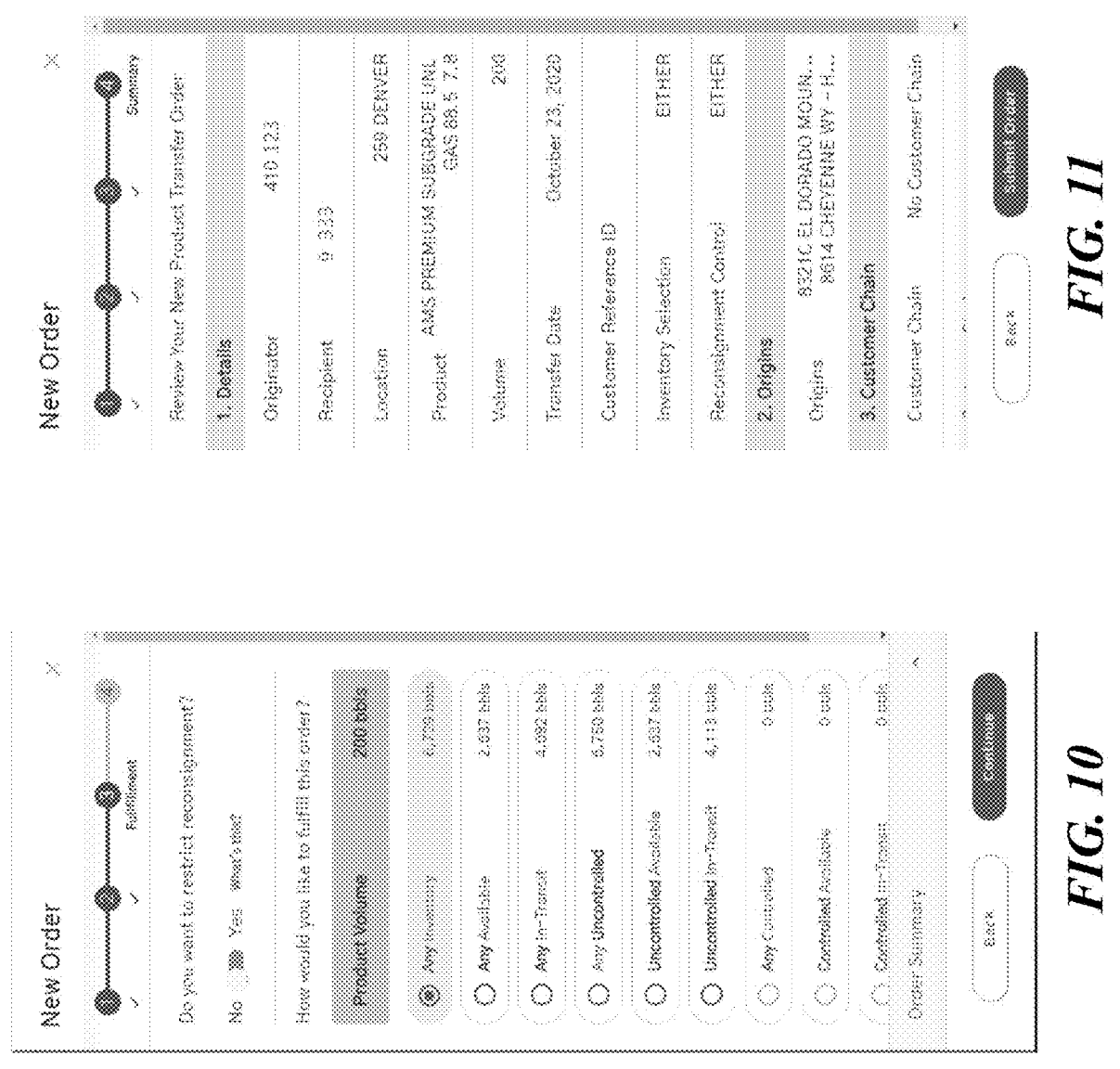

FIG. 10 is an embodiment of a graphical user interface of this disclosure for defining fulfillment of the new order through the user portal.

FIG. 11 is an embodiment of a graphical user interface of this disclosure for reviewing and confirming the new order through the user portal.

Figure 12:
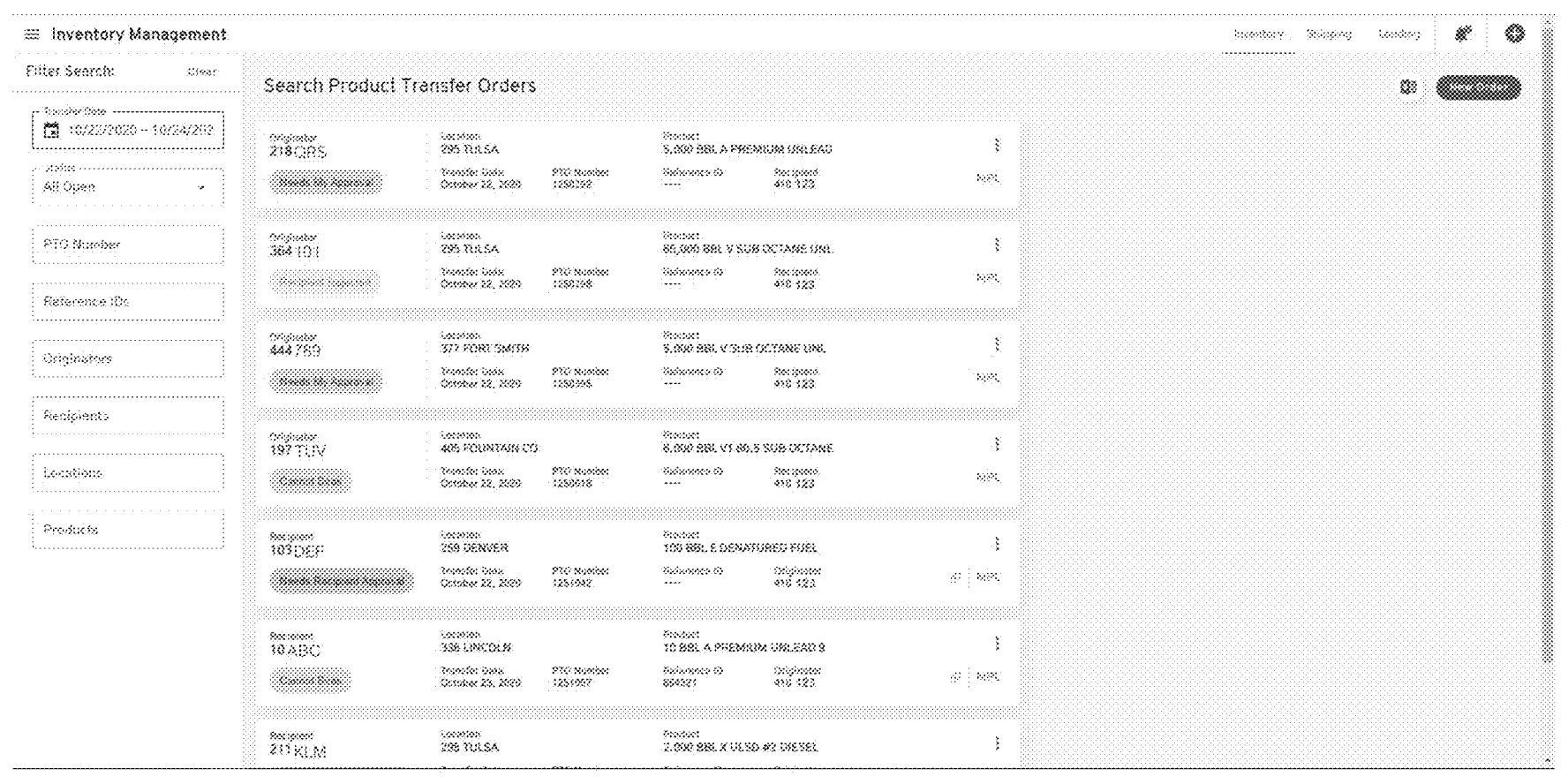

FIG. 12 is an embodiment of a graphical user interface of this disclosure for searching product transfer orders through the user portal.

Figure 13:
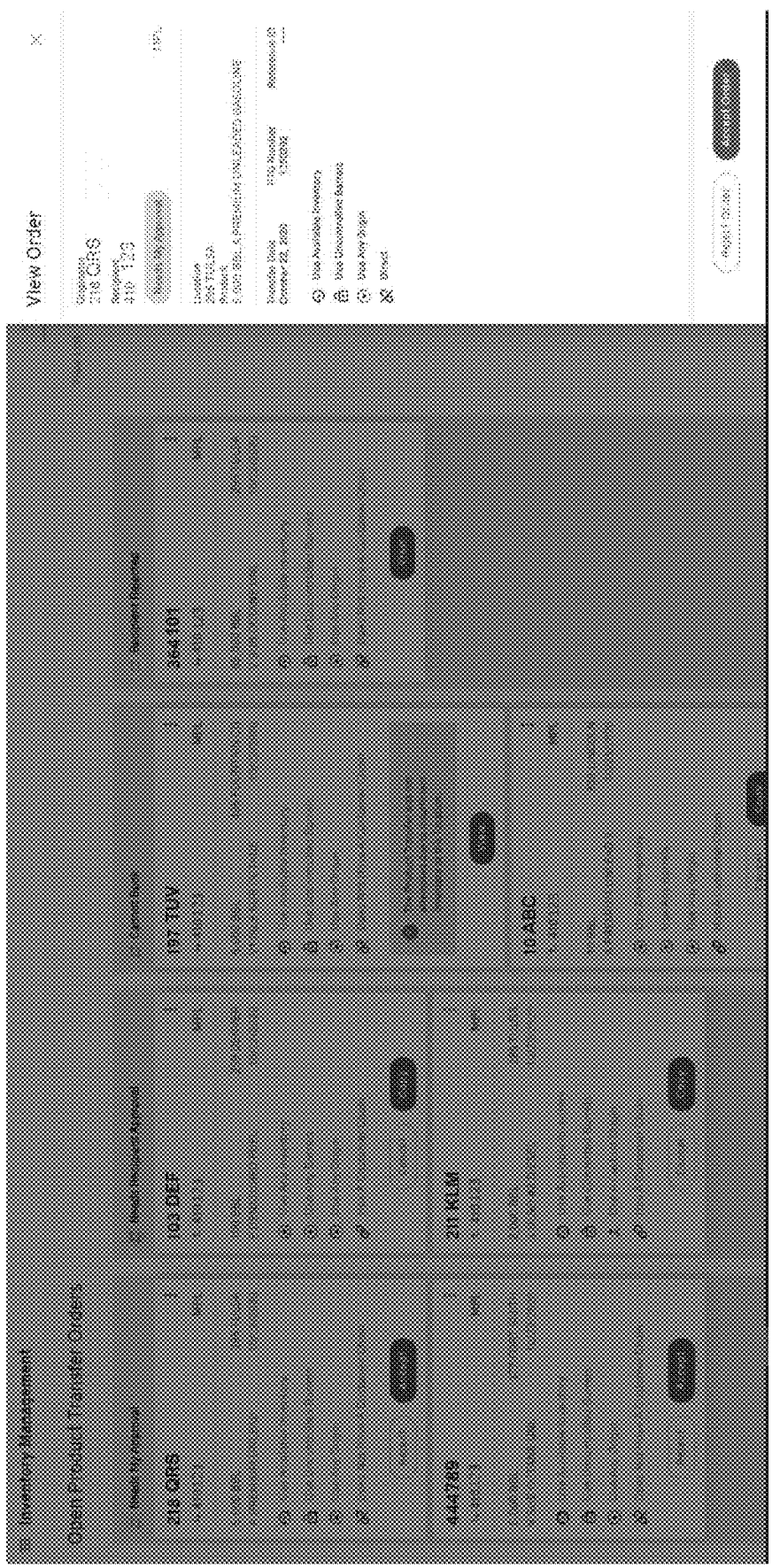

FIG. 13 is an embodiment of a graphical user interface of this disclosure for viewing open product transfer orders through the user portal.

Figure 14:
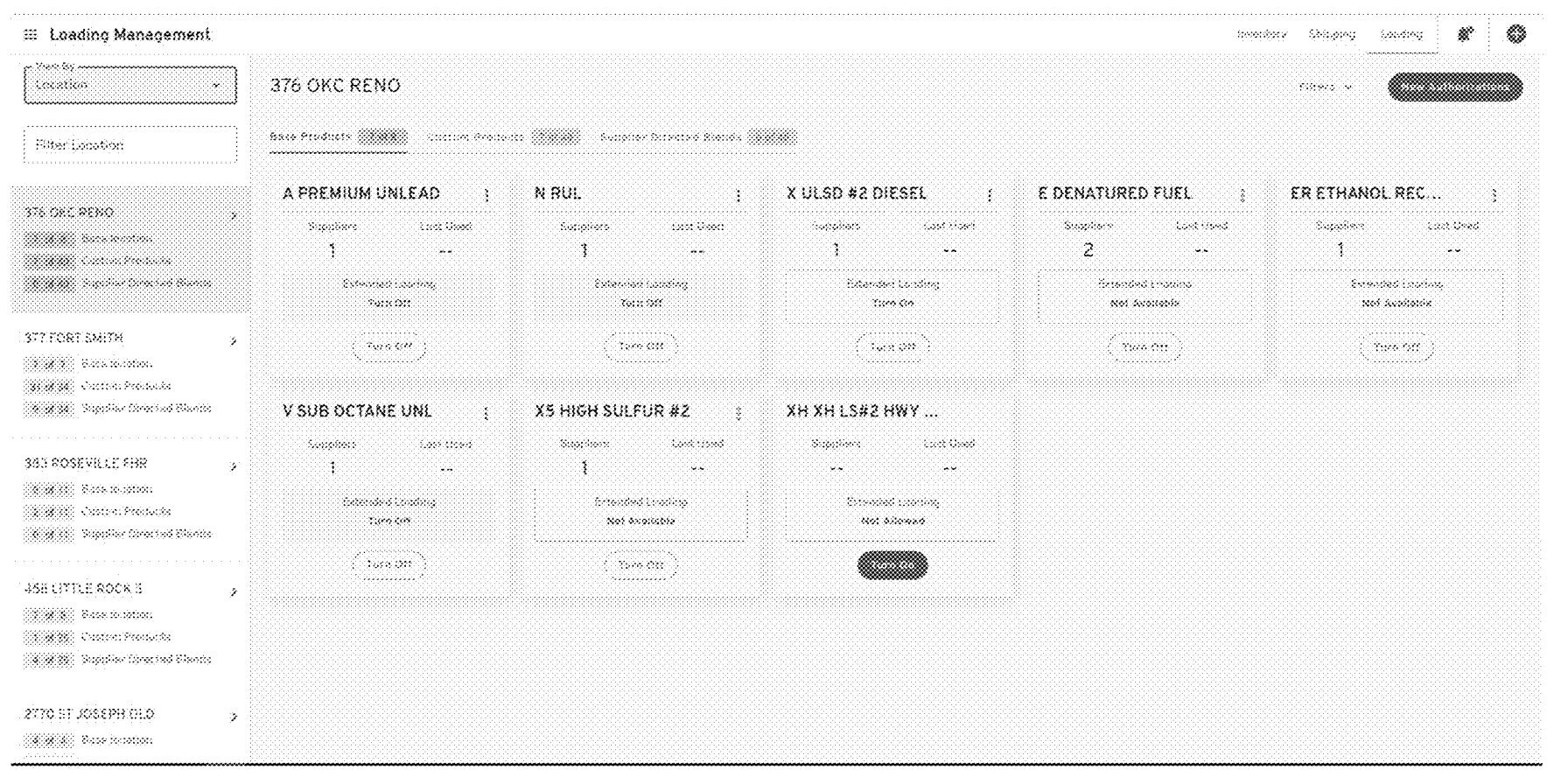

FIG. 14 is an embodiment of a graphical user interface of this disclosure for viewing loading management.

DEFINITIONS

For the purposes of this disclosure, the following definitions apply:

Terminal Automated System—a database containing physical fuel inventory availability data for a single terminal, along with customer managed fuel allocation limits for loading at two or more terminals, along with computerized means of accessing the data stored on the database to facilitate loading at a terminal.

Informed Terminal Automated System—a database containing the physical fuel inventory availability data for a single terminal and now the information about a loading objective electronically submitted by a carrier company, along with computerized means of accessing the data stored on the database to facilitate loading at a terminal.

User Portal—one or more graphical user interfaces that provide a user access to a database containing, for at least one or more retail locations associated with the user or product associated with a supplier, nomination, transportation, logistics, storage, and inventory management, as well as invoicing data, the graphical user interface being displayed on computerized means and accessible over a network, the data being stored in one or more databases in communication with the network.

Pre-Authorization or Pre-Authorization Module—computerized means and associated software through which a driver can enter carrier, trailer, and driver identification data and the software, on the basis of that data for each meter under the rack, queries databases associated with the user portal, the terminal automated system, and at least one of the informed terminal automated system and third party allocation management system to match one or more loads to the driver and determine whether loading of each load is authorized.

DETAILED DESCRIPTION

Embodiments of a central fuel supply management system of this disclosure is in network communication with a retail-side fuel supply chain management system and a fuel terminal automated system. The central fuel supply management system communicates over a network with one or more databases associated with those systems and includes a pre-authorization module. The pre-authorization module includes computer means such as a desktop, laptop, or mobile computing device and associated software and databases arranged to receive carrier, trailer, and driver identifying information; match, for each meter under a truck rack, one or more loads associated with the carrier, trailer, and driver identifying information; query for each of the one or more loads: a nomination system containing information on book stock; a terminal automated system containing information on physical inventory at two or more terminals; and a third party allocation management system containing information on loading quantity limits. On the basis of the query the pre-authorization module decides whether each load of the one or more loads is authorized prior to its loading. Where authorized, the driver loads at the truck rack.

Figure 1:
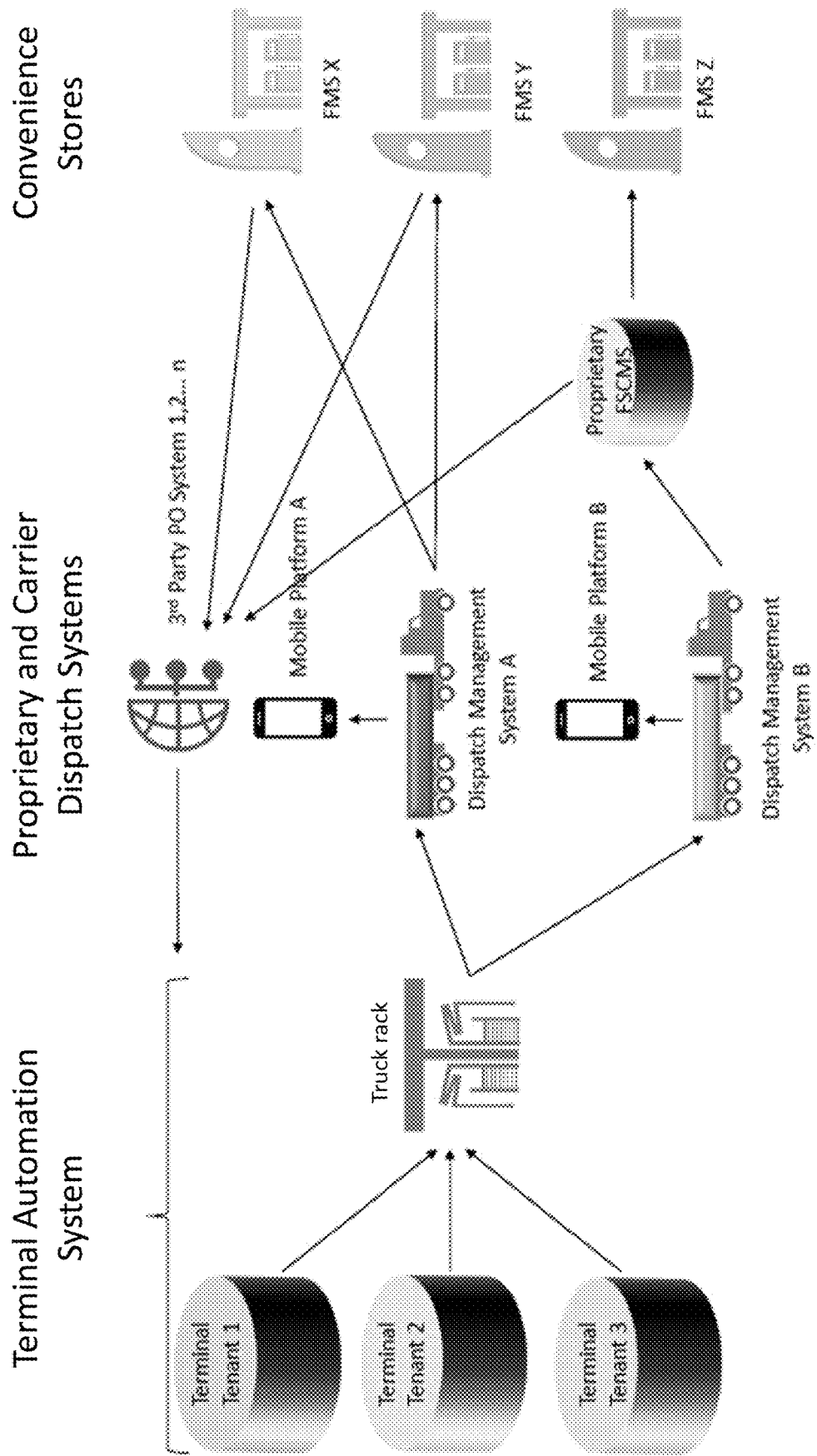
Figure 2:
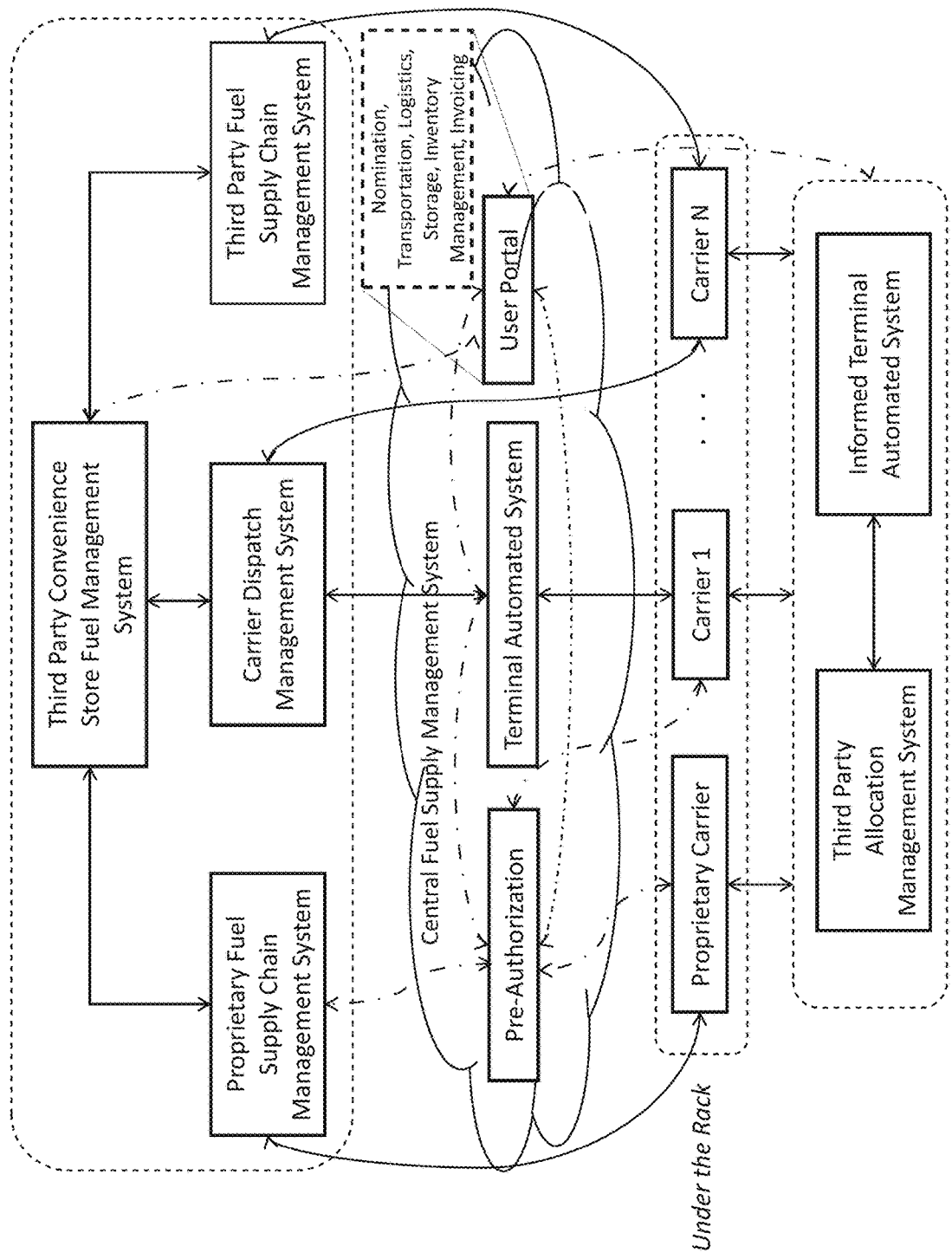
FIG. 2 is a schematic of an embodiment of a fuel management system of this disclosure. Embodiments include a pre-authorization module.
Figure 3:
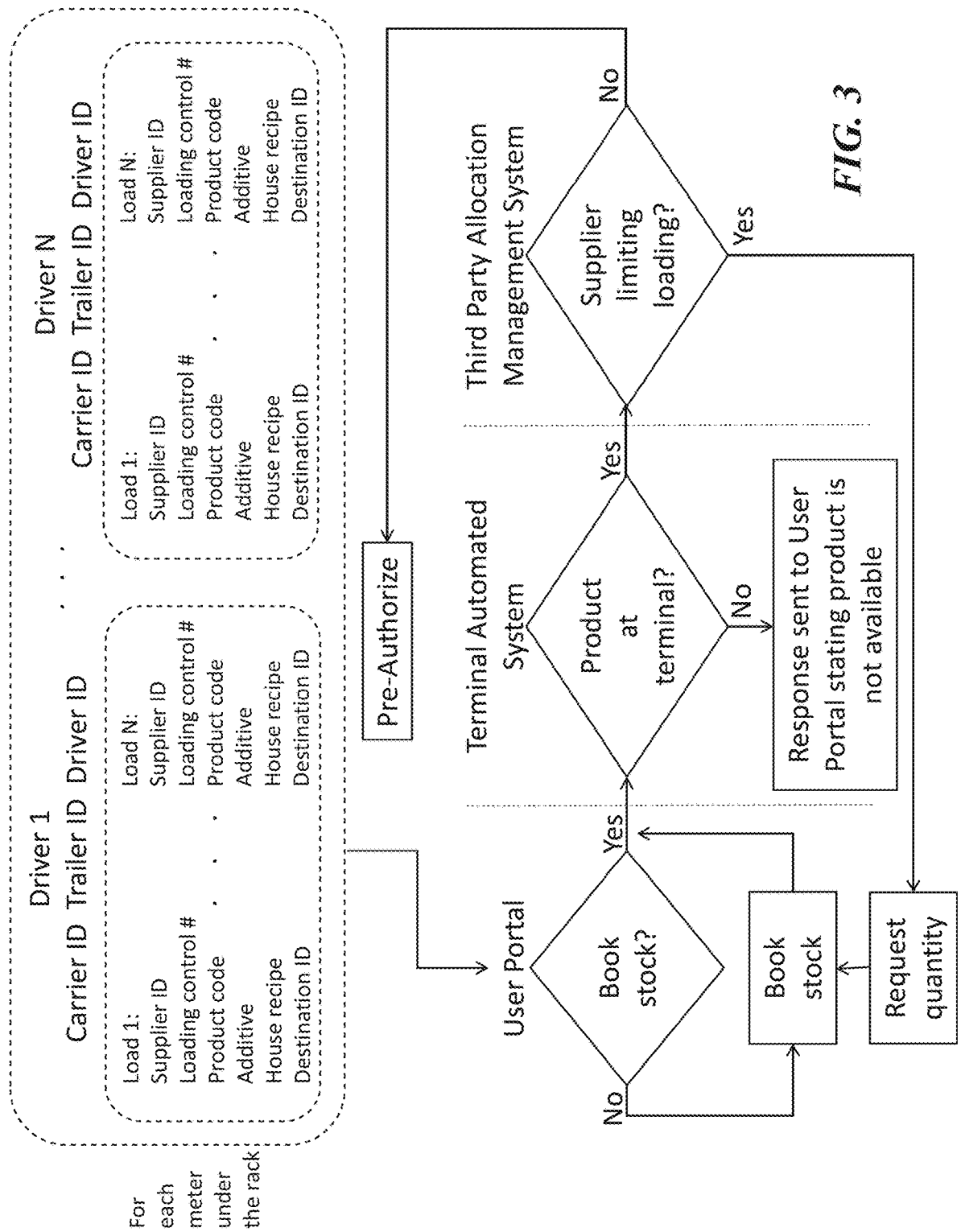
FIG. 3 is a flow diagram of the pre-authorization module of FIG. 2.

Referring first to FIGS. 3 & 4, embodiments of a central fuel supply management system of this disclosure eliminate manual data entry from the driver when at the truck rack and integrate the truck rack with retail gas stations and convenience stores. Systems and methods of this disclosure allow a driver to arrive at the truck rack with a trailer, immediately be identified at the rack to match loads with the trailer, and, based upon the identification, determine whether the load or loads is authorized and load the correct fuel and amount.

In embodiments, a customer-side proprietary fuel supply chain management system, carrier dispatch management system, and third party fuel supply chain management system communicate over a network with the central fuel supply management system. A user portal provides means by which the customer, carrier dispatch, and third party fuel supply interact with the central fuel supply management system and its related databases. The driver, who may drive for a proprietary or common carrier, communicates with the central fuel supply management system through its pre-authorization module.

An informed terminal automated system upstream of the central fuel supply management system communicates over the network with the central fuel supply management system. This system gets "informed" from the central fuel supply management system. The informed terminal automated system may also communicate over the network with third party allocation management systems. The central fuel supply management system receives real-time fuel inventory data from the retail store as well as from the informed terminal automated system, by which it can update its terminal automated system.

No decision making is required on the part of the driver when at the rack for loading. As discussed in the following paragraph, the pre-authorized module maps drivers to authorized loads. When loading, and when loaded, the central fuel supply management system then transmits loading data to the retail store fuel management system. Associated storage and inventory management databases are also updated.

In embodiments of this disclosure, the centralized fuel supply management system includes a pre-authorization module that allows a driver to enter identifying information (e.g. carrier ID, trailer ID, driver ID) and the module, based upon this identifying information—for each meter under the rack—matches the driver with load information (e.g. supplier ID(s), loading control numbers(s), product code(s), additives, house or propriety recipe(s), and destination ID(s)). The preauthorization module communicates over a network with appropriate databases, including nomination, transportation, logistics, storage, and inventory management databases, a terminal automated system and its associated database, and a third party allocation management system and its associated database. The pre-authorization module queries the database and systems to determine whether book stock is available or allocated to the load, whether there is physical product at the terminal, and whether a supplier is limiting loading remotely. The module then authorizes the load or, when loading is not authorized, sends notifications so that appropriate corrective action can be taken.

Referring now to FIGS. 4 to 14, embodiments of a user portal of this disclosure provide information on supplier authorizations and means for creating a supplier authorization; notifications of inventory, shipping, and loading; information on product transfer orders and means for placing a new order, including origin and fulfilment; means to search product transfer orders and view open product transfer orders; as well as providing means to view loading management. The pre-authorization module communicates with one or more of the databases associated with the user portal.

In a method of this disclosure, the central fuel supply management system receives fuel demand quantity from a retail gas station and transmits the fuel demand quantity to a fuel terminal automated system. The fuel terminal automated system receives the fuel demand quantity and allocates the fuel demand quantity to a carrier having a tank truck associated with the at least one retail fuel store. The truck rack includes the pre-authorization module, either under the rack itself or in close proximity (e.g. at the terminal). The pre-authorization module then matches the tank truck to the loads and queries the associated databases to decide whether the truck is authorized to receive the load.

The tank truck upon its arrival at the truck rack transmits the carrier identification to the fuel allocation management system. he fuel allocation management system receives the carrier identification and maps the carrier identification to the fuel demand quantity. When pre-authorized, the fuel allocation management system sends a fuel filling instruction to the truck rack. The truck rack receives the fuel filling instruction and fills the carrier in accordance with the fuel filling instruction. The truck rack sends a fuel completion notification to the fuel allocation management system and to the central fuel supply management system. Each system then updates its records. The central fuel supply management system then notifies at least one retail store of the filling of the tank truck.

What is claimed:

1. A central fuel management system including a pre-authorization module in network communication with a plurality of retail-side fuel supply chain management systems and a fuel terminal automated system containing information on physical inventory at two or more terminals, the pre-authorization module including non-transitory machine readable medium containing instructions thereon, that when executed by a processor:
receive carrier, trailer, and driver identifying information from corresponding ones of the plurality of retail-side fuel supply chain management systems;
match, for each meter under a truck rack at each of the two or more terminals, one or more loads associated with the corresponding ones of the plurality of retail-side fuel supply chain management systems to corresponding ones of the carrier, trailer, and driver identifying information;
simultaneously query for each of the one or more loads being matched:
a nomination system containing information on book stock;
the fuel terminal automated system; and
an allocation management system containing information on loading quantity limits at each of the two or more terminals;
decide, on the basis of the query, whether each load of the one or more loads is authorized by a supplier and a retailer prior to the trailer matched to the load arriving to the truck rack and loading and, where authorized, identify which terminal of the two or more terminals and which truck rack at the identified terminal contains the authorized load; and
for each trailer:
send notifications in advance of the trailer arriving at the truck rack to at least one of the carrier and the driver where load authorization of a load is approved and where load authorization of a load is not approved;
display the notifications to at least one of the carrier and the driver; and
where the load is authorized:
map the driver to the identified terminal and truck rack containing the authorized load and send fuel filling instructions to the truck rack at the identified terminal; and
after loading of the trailer, simultaneously send a completion notification from the truck rack at the identified terminal to the carrier, the fuel terminal automated system, and the allocation management system; and
update one or more databases associated with the nomination system, the fuel terminal automated system, and the allocation management system.

2. The central fuel management system of claim 1, further comprising, a user portal including a graphical user interface arranged to display the notifications.

3. The central fuel management system of claim 2, further comprising, the user portal including one or more graphical user interfaces arranged for a user other than the driver to book, transfer, or book and transfer fuel stock.

4. The central fuel management system of claim 3, further comprising, the user portal including one or more graphical user interfaces arranged to display invoice and payment information for booked or transferred fuel stock.

5. The central fuel management system of claim 1, wherein, the processor is at least one desktop, laptop, or mobile computing device.

6. A method for pre-authorizing loading of fuel at a central fuel management system, the central fuel management system being in network communication with a plurality of retail-side fuel supply chain management system and a fuel terminal automated system containing information on physical inventory at two or more terminals, the central fuel management system comprising a pre-authorization module including non-transitory machine readable medium containing instructions thereon, that when executed by a processor, perform steps of:
receiving carrier, trailer, and driver identifying information from corresponding ones of the plurality of retail-side fuel supply chain management systems;
matching, for each meter under a truck rack, at each of the two or more terminals, one or more loads associated with the corresponding ones of the plurality of retail-side fuel supply chain management systems to corresponding ones of the carrier, trailer, and driver identifying information;
simultaneously querying for each of the one or more loads being matched:
a nomination system containing information on book stock;
the fuel terminal automated system; and
an allocation management system containing information on loading quantity limits at each of the two or more terminals;
deciding, on the basis of the query, whether each load of the one or more loads is authorized by a supplier and a retailer prior to the trailer matched to the load arriving to the truck rack and loading and, where authorized, identifying which terminal of the two or more terminals and which truck rack at the identified terminal contains the authorized load; and
sending notifications in advance of the trailer arriving at the truck rack to at least one of the carrier and the driver where load authorization is approved and where load authorization it is not approved; and displaying the notifications to the at least one of the carrier and the driver; and mapping the driver to the identified terminal and truck rack containing the authorized load and send fuel filling instructions to the truck rack at the identified terminal; and after loading of the trailer, simultaneously sending a completion notification from the truck rack at the identified terminal to the carrier, the fuel terminal automated system, and the allocation management system; and updating one or more databases associated with the nomination system, the fuel terminal automated system, and the allocation management system.

7. The method of claim 6, wherein, the preauthorization module includes a user portal including a graphical user interface arranged to display the notifications.

8. The method of claim 7, wherein, the user portal includes one or more graphical user interfaces arranged for a user other than the driver to book, transfer, or book and transfer fuel stock.

9. The method of claim 8, wherein, the user portal includes one or more graphical user interfaces arranged to display invoice and payment information for booked or transferred fuel stock.

10. The method of claim 6, wherein, the processor includes at least one desktop, laptop, or mobile computing device.

11. The method of claim 6, further comprising:
after the mapping, sending mapping instructions to the driver.

12. The central fuel management system of claim 1, wherein after the map, the instructions send mapping instructions to the driver.

* * * * *